3,814,730
PLATINUM COMPLEXES OF UNSATURATED SILOXANES AND PLATINUM CONTAINING ORGANOPOLYSILOXANES

Bruce D. Karstedt, Charlotte, N.C., assignor to General Electric Company, Waterford, N.Y.
No Drawing. Continuation-in-part of application Ser. No. 61,822, Aug. 6, 1970, which is a division of application Ser. No. 861,199, Sept. 25, 1969, which in turn is a continuation-in-part of application Ser. No. 598,216, Dec. 1, 1966, all now abandoned. This application Feb. 16, 1972, Ser. No. 226,928
The portion of the term of the patent subsequent to Feb. 6, 1990, has been disclaimed and dedicated to the Public
Int. Cl. C08f *11/04*
U.S. Cl. 260—46.5 UA                 9 Claims

ABSTRACT OF THE DISCLOSURE

Platinum complexes of unsaturated siloxanes are provided which are useful as hydrosilation catalysts. These platinum-siloxane complexes must contain less than about 0.1 gram atom of halogen, per gram atom of platinum, and preferably substantially free of halogen which include platinum-siloxane complexes which are substantially free of inorganic halogen. These platinum-siloxane complexes can be made by effetcing contact between a platinum halide and an unsaturated siloxane, for example, 1,3-divinyltetramethyldisiloxane, and removing available inorganic halogen from the resulting material. In addition, curable organopolysiloxane compositions are provided comprising an organopolysiloxane polymer and an effective amount of such platinum-siloxane complex.

---

This application is a continuation-in-part of parent case Ser. No. 61,822, filed on Aug. 6, 1970, which present application is a division of copending application Ser. No. 861,199, filed Sept. 25, 1969, which in turn is a continuation of application Ser. No. 598,216, filed Dec. 1, 1966 and now all abandoned.

The present invention relates to platinum-siloxane complexes of unsaturated siloxanes which are useful as hydrosilation catalysts, and to curable organopolysiloxane compositions containing such catalysts. In addition, the present invention relates to methods for making these materials.

Prior to the present invention, various hydrosilation methods were known for effecting the addition of an organosilicon material, having a hydrogen atom attached to silicon, to an aliphatically unsaturated material having either olefinic or acetylenic unsaturation resulting in the formation of an adduct having a new silicon-carbon linkage. The reaction is illustrated with respect to the olefinic double bond as follows:

$$\equiv\text{SiH} + \overset{|}{\text{C}}=\overset{|}{\text{C}} \longrightarrow \equiv\text{Si}-\overset{|}{\text{C}}-\overset{|}{\text{C}}\text{H}.$$

Many of the known hydrosilation methods involve the employment of a platinum catalyst in the form of a halogenated platinum compound, or finely divided platinum metal. For example, Speier Pat. 2,823,218 utilized chloroplatinic acid as the platinum catalyst. Another method is Bailey Pat. 2,970,150 which shows the employment of platinum metal supported on a finely divided carrier, such as charcoal. Additional methods are shown by Ashby Pats. 3,159,601 and 3,159,662, and Lamoreaux Pat. 3,220,972, all of which are assigned to the same assignee as the present invention.

Although the above-described platinum catalyzed hydrosilation methods provide for valuable results, the parts by weight of platinum metal values, per million parts of hydrosilation mixture, required for effective results often render these methods economically unattractive. In many instances, for example, substantial amounts of platinum metal values are rendered catalytically inactive and beyond recovery. The loss of platinum values can be aggravated by the fact that the use of excessively high parts by weight of platinum catalyst are sometimes required to achieve desirable hydrosilation rates. However, it has been found in particular instances that the rate of hydrosilation is diminished when the prior art platinum catalysts are utilized above normal catalyst weight proportions.

Prior to the present invention, therefore, platinum catalyzed hydrosilation methods often resulted in the loss of undesirable amounts of platinum metal values. In addition, the limited cure rate provided by the employment of prior art platinum catalyst has often limited the extension of hydrosilation as a cure mechanism in organopolysiloxane compositions.

The present invention is based on my discovery that significantly improved hydrosilation results can be achieved with certain platinum-siloxane complexes, as defined hereinafter. These platinum-siloxane complexes have available inorganic halogen sufficient to provide for less than 0.1 of gram atoms of halogen, per gram atom of platinum and preferabbly substantially free of halogen, having value of up to about one. As known by those skilled in the art, conventional platinum halides employed as hydrosilation catalysts have available inorganic halide sufficient to provide for an average ratio of gram atoms of halogen, per gram atoms of platinum having a value of at least about two.

Although I do not wish to be bound by theory, I have found that in order to produce the platinum-siloxane complexes of the present invention, there must be utilized (A) platinum halide, and (B) a complexing material in the form of an unsaturated organosilicon material selected from, (a) Unsaturated silanes of the formula, (1)                 $R_aR_b'SiX_{4-a-b}$, and (b) Unsaturated siloxanes of the formula, (2)                 $R_cR_d'SiO_{\frac{(4-c-d)}{2}}$,

where R is free of aliphatic unsaturation and selected from monovalent hydrocarbon radicals, and R' is selected from monovalent aliphatically unsaturated hydrocarbon radicals, X is a hydrolyzable radical, $a$ is a whole number having a value between 0 to 2, inclusive, $b$ is a whole number having a value between 1 to 4, inclusive, the sum of $a$ and $b$ is equal to 1 to 4, incusive, $c$ has a value equal to 0 to 2, inclusive, $d$ has a value equal to 0.0002 to 3, inclusive, and the sum of $c$ and $d$ is equal to 1 to 3, inclusive.

Although platinum metal may be used in SiH-olefin addition reactions, it has been found that it is desirable to complex the platinum with some other compound so as to obtain a catalyst which is more efficient and effective as a catalyst. Commercially complexed platinum is only available as a halogenated complexed material. Thus, in order to produce various complexes from platinum it is necessary to use a form of platinum which has sufficient reactivity. As a result, it is necessary to buy and use the halogenated complex of platinum that is commercially available and which halogenated complexes of platinum has the necessary reactivity in order to form other complexes of platinum which were found to be more reactive.

In both Willing U.S. Pat. 3,419,593 and Kelly et al. U.S. Pat. 3,474,123, there is described the formation of a complex of platinum by reacting an unsaturated silane or siloxane with a halogenated complex of platinum. Willing states the advantages of his complex is that it appears to be more efficient or reactive than either platinum-on-charcoal or chloroplatinic acid. While Willing's statements may be taken as true, Willing's complex still suffers from a deficiency in reactivity.

In the present invention there has been made the unexpected discovery that the presence of halogen in a platinum complex formed from a halogenated complex of platinum and unsaturated silane or siloxane seriously retards the efficiency of the catalyst and that it is desirable to remove most if not all of the halogen from the complex. It should be pointed out that of necessity there must be halogen present in the complex since one of the ingredients to forming the complex of Willing, Kelly et al. or that of the present invention is the commercially available halogenated complex of platinum. It was the discovery of the present invention, however, that to obtain a platinum complex catalyst of the highest efficiency and reactivity that there must be removed most if not all of the halogen from the platinum unsaturated siloxane catalyst of the present invention. Thus, the present invention provides a novel and unobvious platinum complex catalyst which is more efficient and more reactive than the platinum complex catalysts of the prior art such as that of Willing and Kelly et al.

There is provided by the present invention a platinum complex catalyst containing little if any halogen which complex is extremely efficient and reactive and in fact is the most efficient catalyst known for SiH-olefin addition reactions. Up to the present time no one has analyzed the effect of halogen on a platinum catalyst. It was assumed by the worker skilled in the art that since chloroplatinic acid was more reactive than elemental platinum that halogen had no effect or in effect enhanced the reactivity of the platinum metal. It was this inventor's discovery that the catalyst was in effect the platinum ion and that the presence of halogen ion deleteriously affected the efficiency of the platinum ion. Both Willing and Kelly et al. also assumed that halogen had no effect or promoted the catalyst activity of the platinum ion. Such assumptions by the prior workers in the field led to the formation of various platinum complex catalysts with high halogen content. It was not until the present invention that a platinum complex catalyst was developed with little if any halogen content.

The platinum-siloxane complexes of the present invention can be made by (1) effecting contact between an unsaturated organosilicon material as defined by formula (1) or (2) above, and a platinum halide to provide for the production of a mixture having a concentration of available inorganic halogen, (2) treating the resulting mixture of (1) to effect the removal of available inorganic halogen, and (3) recovering from (2), a platinum-siloxane complex having available inorganic halogen of less than 0.1 gram atoms of halogen, per gram atom of platinum, and preferably that the complex be substantially halogen free.

As used throughout the description of the present invention, the term "available inorganic halogen," will designate halogen that can be detected by a modification of ASTM designation D-1821-63 for "Inorganic Chloride." The procedure employed is substantially as described, except there is utilized in place of acetone, which is the solvent specified in the test, a mixture of glacial acetic acid and acetone. The procedure employed for determining gram atoms of platinum in the platinum-siloxane complexes was Atomic Absorption Spectroscopy. For example, the method of R. Dockyer and G. E. Hames, Analyst, 84, 385 (1959).

Preferably, the platinum-siloxane complexes of the present invention consist essentially of chemically combined platinum and organosiloxane of the formula, (3)    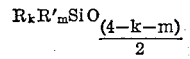

which organosiloxane consists essentially of chemically combined siloxy units selected from (c)
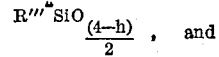   , and (d) Mixtures of (c) and
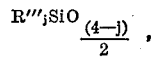   , where R and R' are as defined above, R" is selected from R' radicals chemically combined with platinum, and R''' is selected from R' radicals and R" radicals, $e$ has a value equal to 0 to 2, inclusive, $f$ has a value equal to 0 to 2, inclusive, and $g$ has a value equal to 0.0002 to 3, inclusive, and the sum of $e$, $f$ and $g$ has a value equal to 1 to 3, inclusive, $h$ is an integer equal to 1 to 3, inclusive, and $j$ is a whole number equal to 0 to 3, inclusive.

The above-described platinum-siloxane complexes of platinum and organosiloxanes of formula (3), can be made in accordance with the practice of the invention, as previously described, utilizing a platinum halide, and either an unsaturated silane of formula (1), or an unsaturated siloxane of the formula,

having at least one structural unit of the formula, $$\begin{array}{c} R' \ R' \\ | \ \ | \\ =SiOSi= \end{array}$$

where the unsatisfied valences of the above structural unit can be satisfied by R, R' and oxygen radicals, where R and R' are as previously defined, $k$ has a value equal to 0 to 2, inclusive, $m$ has a value equal to 0.0002 to 3, inclusive, and the sum of $k$ and $m$ has a value equal to 1 to 3, inclusive.

Radicals included by R are, for example, alkyl radicals such as methyl, ethyl, propyl, butyl, pentyl, hexyl, heptyl, octyl, etc.; cycloalkyl radicals such as cyclohexyl, cycloheptyl, etc.; aryl radicals such as phenyl, methyl, tolyl, xylyl, etc. radicals; aralkyl radicals such as benzyl, phenylethyl, phenylpropyl, etc. radicals. Radicals included by R' are, for example, aliphatically unsaturated radicals such as ethynyl, 1-propnyl, etc.; vinyl, allyl, and cycloalkenyl radicals, such as cyclopentenyl, cyclohexenyl, cycloheptenyl, cyclooctenyl, etc. Radicals included by R" are all of the aforementioned R' radicals, which are complexed with platinum; radicals included by R''' are all of the aforementioned R' radicals and R" radicals. In the above formulae where R, R', R" and R''' can represent more than one radical, these radicals can be all the same or any two or more of the aforementioned radicals, respectively.

It is desirable that neither the R nor the R' radicals have chemically combined halogen since the presence of such halogen attached to the hydrocarbon group in the platinum complex will act to inhibit the catalysis effected by the complex. Accordingly, it is preferred to catalyze silanes and siloxanes of formulas (1) and (2) in forming the platinum catalyst of the present invention that do not have combined halogen. However, if there is added combined halogen, that is, the use of compounds of formulas (1) and (2), having therein halogenated hydrocarbon groups, then most of such halogen can be removed by halogen removing procedure outlined in this specification so as to arrive at a final platinum complex which has the low halogen content in accordance with the present specification.

Unsaturated silanes included by formula (1) are, for example, tetra-vinylsilane, tri-allylmethylsilane, divinyldimethylsilane, tri-vinylphenylsilane, divinylmethylphenylsilane, divinylmethylethoxysilane, divinylmethylacetoxysilane, etc.

Included by the unsaturated siloxanes of formula (2) are, for example, disiloxanes of the formula, (5) 

where R, R', $a$ and $h$ are as defined above, and the sum of $a$ and $h$, per silicon atom, is equal to 3. For example, there are included by disiloxanes of formula (5), sym-divinyltetramethyldisiloxane, 1,1 - divinyltetramethyldisiloxane, hexavinyldisiloxane, 1,1,3 - trivinyltrimethyldisiloxane, symtetravinyldimethyldisiloxane, etc.

There are also included by the unsaturated siloxanes of formula (2), cyclopolysiloxanes including chemically combined units of the formula,

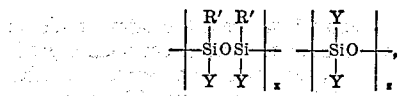

where R' is defined above, Y is selected from R and R' radicals, $x$ is an integer equal to 1 to 9, inclusive, $z$ is a whole number equal to 0 to 17, inclusive, and the sum of $x$ and $z$ is equal to 2 to 17, inclusive. For example, there is included 1,3,5-trivinyl, 1,3,5-trimethylcyclotrisiloxane, 1,3,5,7-tetraallyl, 1,3,5,7 - tetraphenylcyclotetrasiloxane, 1,3-divinyloctamethylcyclopentasiloxane, etc.

The platinum halides which can be employed in the practice of the invention are, for example, $H_2PtCl_6 \cdot nH_2O$ and metal salts such as $NaHPtCl_6 \cdot nH_2O$, $KHPtCl_6 \cdot nH_2O$, $NaPtCl_6 \cdot nH_2O$, $K_2PtCl_6 \cdot nH_2O$.

Also, $PtCl_4 \cdot nH_2O$ and platinous type halides such as $PtCl_2$, $Na_2PtCl_4 \cdot nH_2O$, $H_2PtCl_4 \cdot nH_2O$, $NaHPtCl_4 \cdot nH_2O$, $KHPtCl_4 \cdot nH_2O$, $K_2PtBr_4$.

In addition, platinum halide complexes with aliphatic hydrocarbon as taught in Ashby Pats. 3,159,601 and 3,159,662, for example $[(CH_2=CH_2) \cdot PtCl_2]_2$; $(PtCl_2 \cdot C_3H_6)_2$, etc. Other platinum halides which can be utilized are shown by Lamoreaux Pat. 3,220,972, such as the reaction product of chloroplatinic acid hexahydrate and octyl alcohol, etc.

In addition to the above-described platinum-siloxane complexes, there is also included in the present invention, curable organopolysiloxane compositions having at least 0.01 part, and preferably 1 to 200 parts of platinum, per million parts of organopolysiloxane, comprising (C) organopolysiloxane of the formula, (6) 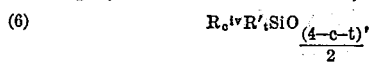

and (D) platinum-siloxane complex as previously defined, and preferably such platinum-siloxane complex consisting essentially of chemically combined platinum and organosiloxane of the formula,

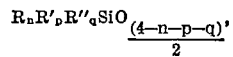

which organosiloxane is included within the scope of formula (3), consisting essentially of from 2 to 500 chemically combined units selected from (e) 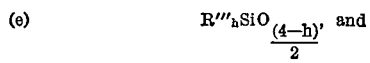 and (f) Mixtures of (e) and

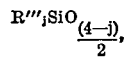

where R, R', R'', $c$, $e$, $f$, $g$, $h$ and $j$ are as defined above, $R^{iv}$ is selected from R radicals and cyanoalkyl radicals, $n$ has a value equal to 0 to 2, inclusive, $p$ has a value equal to 0 to 2, inclusive, $q$ has a value equal to 0.004 to 2, inclusive, the sum of $n$, $p$, and $q$ is equal to 1 to 3, inclusive, and $t$ is equal to 0.001 to 1, inclusive.

The significant difference of how my platinum-siloxane complexes differ from platinum halides of the prior art, is that there is less detectable inorganic halogen present in the platinum-siloxane complex of the present invention. Although I do not wish to be bound by theory, experimental evidence indicates that the platinum is chemically combined to the unsaturated siloxane by at least three $\equiv SiR'$ units, per gram atom of platinum, where R' is as previously defined. In any event, unlike platinum halides of the prior art, the platinum-siloxane complexes of the present invention can be entirely free of available inorganic halogen, or detectable inorganic halogen. In instances where available inorganic halogen is detected in the platinum-siloxane complexes of the present invention, the amount of such available inorganic halogen which can be detected should not exceed that quantity which is sufficient to provide for 0.1 gram atoms of halogen, per gram atom of platinum and preferably that the complex is substantially free of halogen. Otherwise, the activity of the resulting platinum-siloxane complex has been found to be adversely affected. The platinum-siloxane complexes of the present invention are stable for extended periods of time such as six months or more at temperatures between $-50°$ C. to $50°$ C. In some instances, it is preferred to protect the platinum-siloxane complexes from atmospheric moisture.

The platinum containing organopolysiloxane compositions comprising organopolysiloxane polymer of formula (6) and the platinum-siloxane complex of the present invention can be cured to the solid state by the use of a variety of silicon hydrides as shown in my copending application, Ser. No. 598,148, filed Dec. 1, 1966 and now abandoned. Suitable silicon, hydrides which can be employed are, for example, organocyclopolysiloxanes containing at least two chemically combined RHSiO units, and organopolysiloxane polymers having chemically combined $(R^{iv})_aSi(H)_qO$ units, where $R^{iv}$ and $a$ are as previously defined, and $q$ is equal to 1 or 2.

The organopolysiloxane polymers of formula (6) can include chemically combined units of the formula,

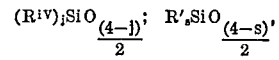

where $R^{iv}$ and $j$ are as previously defined, and $s$ is an integer equal to 1 to 3, inclusive. There are included by the organopolysiloxane of formula (6), fluids, gums and resins depending upon the ratio of $R^{iv}$ radicals to silicon atoms. As a result, the platinum containing organopolysiloxane compositions of the present invention, which are curable upon contact with the above-described silicon hydrides can be used in a variety of useful applications. They can be employed as encapsulants for electronic components where the organopolysiloxane of formula (6) can be an organopolysiloxane fluid having terminal diorganoalkenylsiloxy units, such as dimethylvinylsiloxy units, having a viscosity of at least 500 centipoises at $25°$ C. In addition, organopolysiloxane gums having a viscosity of at least 100,000 centipoises at $25°$ C. and chemically combined methylvinylsiloxy units, etc., can provide for elastomeric forming compositions, etc. In addition, the platinum containing organopolysiloxane of the present invention can contain from 10 to 300 parts of filler per 100 parts of organopolysiloxane. For example, silica filler such as fume silica, non-reinforcing filler such as carbon black, etc.

In the practice of the invention, the platinum-siloxane complexes can be made by initially mixing together the unsaturated organosilicon material and the platinum halide. The resulting mixture is thereafter treated to effect the removal of available inorganic halogen. The platinum-siloxane complex is then recovered from the resulting mixture and further treated to effect the removal of undesirable materials, such as starting reactants, reaction by-products, etc.

Experience has shown that effective results can be achieved in forming the platinum-siloxane complex if there is utilized sufficient unsaturated organosilicon material with respect to the platinum halide, to provide for at least 3 moles of $\equiv SiR'$ units, per gram of platinum. In instances where unsaturated siloxane is utilized having the structural unit

for example, a disiloxane, there should be utilized sufficient unsaturated siloxane to provide for at least 3 moles of the structural unit, per 2 gram atoms of platinum. Experience has shown, however, that the proportions of the unsaturated organosilicon material, and the platinum halide can vary widely. For economic reasons, however, it has been found desirable to utilize an excess of unsaturated organosilicon material to avoid loss of platinum values.

After the platinum halide and the unsaturated organosilicon material have been mixed together, various procedures can be employed to make the platinum-siloxane complex, depending upon the nature of the platinum halide and the unsaturated organosilicon material utilized. For example, in some instances a temperature between $-50°$ C. to $200°$ C. can be employed, while a preferred temperature is between $0°$ C. to $100°$ C.

If the platinum halide is in the form of a platinum-olefin complex, immediate reaction can occur without the employment of external heat. In some instances, external cooling may be necessary.

After the addition has been completed, various procedures can be employed to effect the removal of available inorganic halogen. In order to facilitate the removal of inorganic halogen, it has been found desirable to insure that sufficient water is present in the mixture, which if expressed in number of moles, would be at least equal to the product of the number of gram atoms of platinum times its valence number. Experience has shown, however, that in all instances, unless water is specifically excluded, more than the minimum amount of water is generally present in the mixture, due to atmospheric moisture, or water chemically combined or associated in reactants, solvents, etc., employed during the preparation of the platinum-siloxane complex.

One procedure which may be used for removing available halogen from the reaction mixture is a stripping technique which can combine the employment of heat and reduced pressure, such as pressures of about $10^{-3}$ mm. or above with the base addition procedure. However, this method if used should be combined with the main base addition method discussed below if a complex is to be obtained having a 0 to 2000 p.p.m. of halogen per part of platinum, which is the platinum complex of the present invention.

Another technique which has been found effective for removing available inorganic halogen is the employment of a base which serves to neutralize halogen acid which can be present in the mixture. Suitable bases are, for example, alkali carbonate, such as sodium carbonate, potassium carbonate, sodium bicarbonate, etc., alkali earth carbonates and bicarbonates, alkali hydroxides, such as sodium hydroxide, potassium hydroxide, etc. The employment of base in the moderate excess of that required to neutralize all available inorganic haolgen to form corresponding salts provides for effective results. Less than a stoichiometric amount can be employed, but at least that amount must be utilized to provide for the removal of available inorganic halogen so that the average ratio of gram atoms of halogen, per platinum atom, will fall within the scope of the present invention.

The addition of a base is the basic method for removing halogen from the platinum complex and even if used by itself will result in a platinum complex having less than 0.1 gram atoms of halogen per gram atoms of platinum and preferably be substantially free of halogen. In combination with the base addition method, there may be used other procedures such as the heating and stopping procedure mentioned above. Further there may be added absorbents such as molecular sieves to the complex to absorb the salts that are formed when the base is added.

Another method which can be utilized in addition to the base method to effect removal of available inorganic halogen, where platinum halides are employed which are insoluble in organic solvents, for example, $K_2PtCl_4$ is the use of certain catalysts, such as $SnCl_2 \cdot H_2O$. After the platinum-siloxane complex is produced in an aqueous medium using this catalyst, the recovery of the platinum-siloxane complex can be achieved by employing a nonpolar organic solvent while the excess inorganic haolgen will be left in the aqueous medium.

The employment of an organic solvent has been found experient to facilitate contact between the platinum halide and the unsaturated organosilicon material when initially mixed together. In some instances, a mixture of the organic solvent and water can be employed, while in other situations, the unsaturated organosilicon material itself can serve as a solvent. The nature of the solvent can vary depending upon the type of platinum halide utilized, as well as the nature of the unsaturated organosilicon materials. Generally, however, there can be utilized hydrocarbon solvents, such as aromatic hydrocarbon alcohols, for example, ethyl alcohol, as well as other low molecular weight aliphatic alcohols, ethers, etc.

As a result of the base addition method of treatment employed to remove inorganic halogen from the resulting platinum-siloxane complex, various impurities, such as salts, molecular sieves, etc., can be associated with the platinum-siloxane complex. A convenient method for removing undesirable materials is to strip the reaction mixture of solvent, and then extract the platinum-siloxane complex with a suitable solvent, such as a non-polar hydrocarbon solvent, followed by filtration. In instances where the unreacted organosilicon material is sufficiently volatile, it will often be removed during the stripping step.

It has been found in most instances when the platinum-siloxane complex forms, that new infrared absorption frequencies appear at 7.5–7.6 microns and 8.34 microns. In addition, if unsaturated organosilane is utilized, siloxane can be formed by hydrolysis of hydrolyzable radicals or by cleavage of R' radicals from silicon, when b in formula (1) is 2 or more. Preferably, the aforementioned unit structure should be in the same molecule. However, it has been found that in certain situations valuable results have been achieved where unsaturated siloxane has been employed as a reactant, having only terminal unsaturation.

In instances where a large excess of unsaturated organosilicon material may initially be utilized in making the platinum-siloxane complex which cannot be readily removed by a stripping technique, a mixture of the platinum-siloxane complex and the unsaturated siloxane can be recovered as a platinum-containing organopolysiloxane, as defined within the scope of the invention. Curable organopolysiloxane compositions also can be made by mixing the platinum-siloxane complex with organopolysiloxanes of formula (6). The mixing of the ingredients can be achieved by milling in instances where the organopolysiloxane is a gum, or by the employment of a solvent where it is a resin. Alternatively, where the organopolysiloxane and platinumsiloxane complex are fluids, mere mixing of the ingredients can suffice.

In order that those skilled in the art will be better able to practice the invention, the following examples are given by way of illustration and not by way of limitation. All parts are by weight.

EXAMPLE 1

There is added 27.8 parts of 1,3-divinyltetramethyldisiloxane to 19.5 parts of $(PtCl_2 \cdot C_2H_4)_2$. The mixture is then slowly warmed to $30°$ C. over a period of 1 hour and is maintained for an additional hour at 25 to $30°$ C. with the aid of an ice bath. During this period, ethylene gas is continuously evolved and yellow-red liquid and orange solid remained. Analysis of the product showed that it has a ratio of about 2 gram atoms of chlorine, per gram atom of platinum.

Benzene is added to the above mixture and it is stirred for a period of about 2 hours. There is then added about 48 parts of ethyl alcohol containing about 4½% by weight of water. An exothermic reaction occurred and the reaction mixture is cooled to maintain it at 25 to 30° C. There is obtained a yellow-red solution after the addition is completed. There is then added to the mixture 12.5 parts of sodium bicarbonate resulting in a vigorous evolution of gas. The addition of the sodium bicarbonate is controlled to moderate the rate of gas evolution. After stirring the mixture for an hour at room temperature, it is filtered. The solids are then washed with a mixture of ethanol and benzene. The filtrate is then vacuum stripped of volatiles and a 95% yield of a yellow-red oil is obtained based on starting reactants. Analysis of the product by infrared showed that it is a complex of a 1,3-divinyltetramethyldisiloxane having an out of plane shift of $\equiv$CH bending from 10.5 microns and 10.7 microns. Analysis for platinum and inorganic chlorine shows a ratio of chlorine atoms, per platinum atom, having a value less than 0.1.

EXAMPLE 2

The platinum-siloxane complex of Example 1 is added to an organopolysiloxane mixture having a viscosity of about 4,000 centipoises at 25° C. of polydimethylsiloxane having terminal dimethylvinylsiloxy units and a copolymer composed of chemically combined $SiO_2$ units, $(CH_3)_3SiO_{0.5}$ units and $(CH_2{=}CH)CH_3SiO$ units in an amount to provide for a platinum containing organopolysiloxane composition having 2 parts of platinum, per million parts of mixture. Another platinum containing organopolysiloxane composition is made in accordance with the teaching of the present invention, following the same procedure, containing 10 parts of platinum, per million parts of organopolysiloxane.

Other mixtures are prepared following the same procedure with a variety of prior art platinum halides, to produce mixtures of 2 parts of platinum, per million parts of organopolysiloxane, and 10 parts of platinum, per million parts of organopolysiloxane.

There is added to 100 parts of each of the above-described platinum containing organopolysiloxane mixtures, 10 parts of a copolymer of chemically combined $SiO_2$ units and $H(CH_3)_2SiO$ units. The table below shows the results obtained with the various platinum containing organopolysiloxane mixtures containing either the platinum-siloxane complex of the present invention (Karstedt) or other platinum halides. In the table, there is shown the time required in minutes to achieve a non-pourable condition, "No Flow Time" with the various platinum containing organopolysiloxane mixtures.

TABLE

| P.p.m./Pt | No flow time | |
|---|---|---|
| | 2 | 10 |
| Karstedt | 210 | 16 |
| 1,5-hexadiene platinum dichloride | 1,770 | 205 |
| $H_2PtCl_6.6H_2O$ | 2,840 | 568 |
| $(CH_2{=}CH_2.PtCl_2)_2$ | 1,440 | 228 |
| $Na_2PtCl_4.4H_2O$ | | 2,880 |

Based on the above results, those skilled in the art would know that the platinum-siloxane catalyst of the present invention (Karstedt) provides for significantly improved cure times with curable organopolysiloxane mixtures. In addition, the above results also show the valuable advantages achieved by utilizing the platinum containing organopolysiloxane compositions of the present invention which can be cured at significantly faster rates at the same parts per million of platinum, as compared to prior art platinum containing organopolysiloxane compositions. The advantages are dramatically shown by the above results where the no flow time utilizing Karstedt catalyst at 2 parts of platinum per million parts of mixture, is about the same as that achieved with 1,5-hexadiene platinum dichloride, utilized at 10 parts of platinum, per million parts of mixture.

EXAMPLE 3

An amount of sodium bicarbonate is added to a mixture of 25 parts of $Na_2PtCl_4.4H_2O$, 50 parts of 1,3-tetramethyldisiloxane and 125 parts of ethyl alcohol, to provide for the production of a mixture having available inorganic chlorine sufficient to provide for an average ratio of chlorine atoms, per platinum atom of a value of less than 0.1. Another mixture is prepared following the same procedure free of sodium bicarbonate.

The above mixtures are heated for 5 minutes at a temperature between 70 to 75° C. The solids are washed with ethyl alcohol and are combined with the respective filtrates. Analysis for available inorganic halogen by the modified ASTM designation D-1821-63 for Inorganic Chloride shows that mixture #1 heated with sodium bicarbonate has an average ratio of 0.05 gram atoms of chlorine, per platinum atom. The untreated mixture #2 has an average ratio of 2.2 gram atoms of chlorine, per platinum atom.

In accordance with Example 2, platinum containing organopolysiloxane mixtures were prepared utilizing mixtures #1 and #2 having 10 parts of platinum, per million of mixture. The no flow time which is obtained with the mixtures are as follows, where Cl/Pt indicates gram atoms of chlorine, per gram atom of platinum.

| Cl/Pt | No flow time/min. |
|---|---|
| 0.85 | 135 |
| 2.2 | 315 |

EXAMPLE 4

There is added 25 parts of sodium bicarbonate to a mixture of 25 parts of sodium chlorplatinite, 50 parts of 1,3-divinyltetramethyldisiloxane and 125 parts of ethyl alcohol. The mixture is then heated for 15 minutes at a temperature between 70 to 75° C. The mixture is then filtered and the solids were washed with ethyl alcohol which was combined with the filtrate. The filtrate is then vacuum stripped of volatiles. The residue is dissolved in 25 parts of benzene, filtered and again vacuum stripped of volatiles. There is obtained 35.6 parts of a red-brown transparent oil.

The oil crystallizes at −13° C. Infrared shows the presence of a divinyltetramethyldisiloxane having an out of plane shift of $\equiv$CH bending from 10.5 microns to 10.7 microns. There also is absorbence at 7.5–7.6 microns and 8.34 microns. Elemental analysis for Pt, C, H and Si and its infrared spectrum shows that the complex had three

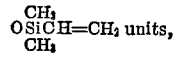

chemical combined with each gram atom of platinum.

There is placed under vacuum ($10^{-4}$ mm.), 0.7 part of the above crystalline platinum-siloxane complex. It decomposes at 130° C. There is obtained 0.4 part of organosiloxane of which 90% by weight was 1,3-divinyltetramethyldisiloxane, as identified by its infrared spectrum.

Based upon the above results, those skilled in the art would known that the platinum-siloxane had a ratio of 3 moles of the structural unit

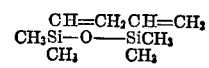

chemically combined iwth each group atom of platinum through $\equiv SiC_2H_3$ linkages.

EXAMPLE 5

Two parts of 1,3,5,7-tetramethyl-1,3,5,7-tetravinylcyclotetrasiloxane is added to a mixture of 2 parts of sodium chloroplatinite, 8 parts of ethyl alcohol, and 2 parts of sodium bicarbonate. The resulting mixture is heated at a temperature between 70 to 75° C. for 10 minutes. The mixture is then purged with nitrogen to remove volatiles followed by the addition of 20 parts of benzene. There is obtained a mixture of a yellow liquid and solid. The mixture is filtered. Analysis for platinum and available inorganic chlorine shows a ratio of less than 0.1 gram atoms of chlorine, per gram atom of platinum. Infrared absorbence also is at 7.5–7.6 and 8.34 microns.

EXAMPLE 6

There was added 20 parts of sodium bicarbonate to a mixture of 10 parts of $H_2PtCl_6 \cdot 6H_2O$, 20 parts of 1,3-divinyltetramethyldisiloxane and 50 parts of ethyl alcohol. The mixture is agitated while being refluxed for a period of 30 minutes, and left undisturbed for 15 hours. The mixture is filtered, stripped of volatiles under vacuum. There is obtained 17 parts of a liquid product. It is dissolved in benzene and filtered. The product is a platinum-siloxane complex substantially free of available inorganic chlorine, based on inorganic chloride analysis.

The above platinum-siloxane complex in benzene is incorporated into the dimethylvinylsiloxy terminated polydimethylsiloxane of Example 2, to produce a platinum containing organopolysiloxane having 10 parts of platinum, per million of mixture. A no flow time is achieved in less than a minute. Similar mixtures containing prior art platinum (II) chlorides remain fluid after several hours.

EXAMPLE 7

There is added 2 parts of sodium bicarbonate to a mixture of 2 parts of $Na_2PtCl_4 \cdot 4H_2O$, 2 parts of dimethyl divinylsilane, and 8 parts of ethyl alcohol. When the mixture is stirred, exothermic heat is produced along with gaseous evolution. The mixture is then heated gently for about 1 minute and then left undisturbed for 10 minutes. Volatiles are then purged from the mixture with nitrogen. There are then added 20 parts of benzene to the mixture and the mixture is filtered and the filtrate is stripped of organic solvent with nitrogen. A liquid was obtained which was mixed with a solvent mixture of equal parts by weight of benzene and ethyl alcohol. Analysis of the mixture for available inorganic chlorine and platinum showed a platinum ratio of less than 0.1 gram atoms of chlorine, per gram atom of platinum. In addition, its infrared spectrum showed the presence of siloxane and was identical to the infrared spectrum of the platinum-siloxane complex prepared in Example 4.

The above procedure is repeated except that there is utilized 6 parts of diphenyldivinylsilane in place of the dimethyldivinylsilane. Analysis of the resulting product shows a ratio of less than 0.1 gram atoms of chlorine, per platinum atom. The infrared spectrum of the product also shows the presence of disiloxane and absorption bands due to the presence of phenyl radicals attached to silicon.

The above-described platinum siloxane complexes showing tetramethyldisiloxane and tetraphenyldisiloxane absorption are utilized as hydrosilation catalysts in a procedure similar to that shown in Example 2. It is found that the no flow state is achieved in considerably less time that achieved with platinum halides having an average ratio of at least 2 gram atoms of chlorine, per platinum atom.

EXAMPLE 8

Following the teaching of Bruner Pat. 3,105,061, an organopolysiloxane polymer is made by quickly adding about one mole of 1,3-diacetoxy, 1,3-divinyl, 1,3-dimethyl- disiloxane to a mole of sym-tetramethyldisiloxane, 1,3-diol. The mixture is allowed to stand under atmospheric conditions for about 24 hours, and then stripped. Based on method of preparation, there is obtained a polymer having about 500 chemically combined siloxy units, including units of the formula,

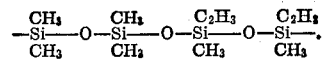

There is added two parts of sodium bicarbonate to a mixture of 4 parts of the above organopolysiloxane, 2 parts of $Na_2PtCl_4 \cdot H_2O$ and 8 parts of ethyl alcohol, and 8 parts of benzene. The mixture is allowed to stand under atmospheric conditions for about 1 week. It is then vacuum stripped and mixed with benzene and then filtered. There is obtained a platinum-siloxane complex having an average ratio of less than 0.1 gram atom of chlorine, per platinum atom.

EXAMPLE 9

A platinum-siloxane complex of Example 1 is milled with a polyorganosiloxane having a viscosity of about 5 million centipoises at 25° C. composed of chemically combined dimethylsiloxy units, methylcyanoethylsiloxy units, methylvinylsiloxy units and chain-stopped with dimethylvinylsiloxy units. There is about 0.2 mole percent of methylvinylsiloxy units in the polymer, based on the total of chemically combined siloxy units. The amount of platinum-siloxane complex employed is sufficient to provide for an organopolysiloxane composition having about one part of platinum, per million parts composition. There is milled with 100 parts of this platinum containing organopolysiloxane composition, 0.15 part of tetramethylcyclotetrasiloxane. The resulting composition is then quickly transferred to a mold and heated in a press for ten minutes at 300° F. There is obtained a cured elastomer having valuable properties.

EXAMPLE 10

Into a three-liter flask there is placed 268 g. $NaHCO_3$ and 761 g. of $[(CH_3(CH_2=CH)Si]_2O$. The air in the flask is displaced with nitrogen and a solution of 190 g. $H_2PtCl_6 \cdot 6H_2O$ in 381 g. of ethyl alcohol is added at room temperature with good agitation of the flask contents. While maintaining the blanket of nitrogen, the mixture is then heated to 65° C. for 25 minutes. The temperature is then reduced to 40° C. and volatile materials are stripped from the flask under vacuum. The temperature is maintained at 40–45° C. during the stripping operation which is concluded at 45° C. and 5 mm. pressure. Then 381 g. of xylene is added to the residue from the stripping step and the slurried mixture is filtered to remove the abundant volume of salts. The filtrate is a straw-colored solution and is a platinum complex which contains, by analyses, 0.0027 gram atoms of total chloride per gram atom of platinum.

EXAMPLE 11

A slurry of 45 g. $NaHCO_3$ and 740 g.

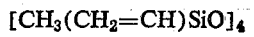

is prepared in a three-liter flask. To this mixture is added a solution of 37 g. of $H_2PtCl_6 \cdot 6H_2O$ in 178 g. of ethyl alcohol. The mixture is heated to 75° C. for one hour. The volatile components are then removed by stripping under vacuum. The resulting residual paste is extracted with 178 g. of xylene and the salts are removed by filtration. The filtrate is a platinum complex which is found to contain 0.0094 gram atoms of total chloride per gram atom of platinum.

While the foregoing examples have of necessity been limited to only a few of the very many variables within the scope of the present invention, it should be understood that the present invention is directed to a much broader class of platinum-siloxane complexes, which can consist essentially of chemically combined platinum and organosiloxanes of formula (3), for example, $$RR'_fR''_hSiOSiR''_hR'_fR_e$$

where R, R', R'', h, f and e are as defined above, the sum of h, f and e per silicon atom is equal to 3, and has available inorganic halogen which is not sufficient to provide for an average ratio of gram atoms of halogen, per gram atom of platinum having a value greater than one. In addition, the present invention is also directed to a much broader class of platinum containing organopolysiloxane compositions comprising the aforementioned platinum-siloxane complexes and organopolysiloxanes of formula (6).

Further, the present invention is broadly directed to a method for making the above-described platinum-siloxane complexes, which can be made by contacting unsaturated organosilicon material of formulas (1) and (2) with a platinum halide and treating the resulting product in accordance with the practice of the invention.

I claim:

1. Platinum-containing organopolysiloxane compositions having at least 0.01 part of platinum per million parts of organopolysiloxane comprising (C) organopolysiloxanes of the formula, $$\frac{R_c{}^{iv}R'_tSiO_{(4-c-t)}}{2},$$

and (D) a platinum-siloxane complex consisting essentially of chemically combined platinum and organosiloxane of the formula, $$\frac{R_nR'_pR''_qSiO_{(4-n-p-q)}}{2},$$

which consists essentially of from 2 to 500 chemically combined units selected from the class consisting of (a) $$\frac{R''_hSiO_{(4-h)}}{2},$$

and mixtures of (a) and $$\frac{R'''_jSiO_{(4-j)}}{2},$$

where the complex has less than 0.1 gram atoms of halogen per gram atom of platinum and where R is free of aliphatic unsaturation and is selected from the class consisting of monovalent hydrocarbon radicals and halogenated monovalent hydrocarbon radicals, R' is selected from the class consisting of monovalent aliphatically unsaturated hydrocarbon radicals and halogenated monovalent aliphatically unsaturated hydrocarbon radicals, R'' is a vinyl radical chemically combined with platinum to effect new infrared absorbtion bands at 7.5 to 7.6 and 8.34 microns in the spectrum of the platinum-siloxane complex, R''' is selected from the class consisting of R radicals and R' radicals, R$^{iv}$ is selected from the class consisting of R radicals and cyanoalkyl radicals, c has a value equal to 0 to 2, inclusive, t has a value equal to 0.001 to 1, inclusive, the sum of c and t is equal to 1 to 3, inclusive, h is an integer equal to 1 to 3, inclusive, j is a whole number equal to 0 to 3, inclusive, n has a value equal to 0 to 2, inclusive, p has a value equal to 0 to 2, inclusive, and q has a value equal to 0.004 to 2, inclusive, and the sum of n, p, and q is equal to 1 to 3, inclusive.

2. A composition in accordance with claim 1, wherein the platinum-siloxane complex consists essentially of platinum chemically combined with 1,3-divinyltetramethyldisiloxane and 1,3-divinyltetraphenyldisiloxane.

3. The composition of claim 1, wherein the platinum-siloxane complex is methylvinylcyclotetrasiloxane.

4. A composition in accordance with claim 1, which contains from 1 to 200 parts of platinum, per million parts of composition.

5. A composition in accordance with claim 1, in which the platinum-siloxane consists essentially of chemically combined platinum and the organosiloxane of the formula, $$R_eR'_fR''_hSiOSiR''_hR'_fR_e,$$

where R is free of aliphatic unsaturation and is a member selected from the class consisting of monovalent hydrocarbon radicals and halogenated monovalent hydrocarbon radicals, R' is selected from the class consisting of monovalent aliphatically unsaturated hydrocarbon radicals and halogenated monovalent aliphatically unsaturated hydrocarbon radicals, R'' is a vinyl radical chemically combined with platinum to effect a shift from 10.5 to 10.7 microns in the out-of-plane C—H bending of the ≡Si—CH=CH$_2$ group in the infrared spectrum of the platinum-siloxane complex, e has a value equal to 0 to 2, inclusive, f has a value equal to 0 to 2, inclusive, h is an integer equal to 1 to 3, inclusive, and the sum of e, f and h per silicon atom is equal to 3.

6. A composition in accordance with claim 1, in which the platinum-siloxane complex consists essentially of platinum complexed with 1,3-divinyltetramethyldisiloxane.

7. A composition in accordance with claim 1, which contains a filler.

8. The composition of claim 1, wherein the aliphatically unsaturated siloxane has at least one structural unit of the formula, $$\begin{array}{c} R'' \quad R'' \\ | \quad\quad | \\ =Si-O-Si= \end{array}$$

where R'' is a vinyl radical chemically combined with platinum.

9. Platinum-containing organopolysiloxane compositions having at least 0.01 part of platinum per million parts of organopolysiloxane comprising (C) organopolysiloxanes of the formula, $$\frac{R_c{}^{iv}R'_tSiO_{(4-c-t)}}{2},$$

and (D) a platinum-siloxane complex consisting essentially of chemically combined platinum and organosiloxane of the formula, $$\frac{R_nR'_pR''_qSiO_{(4-n-p-q)}}{2},$$

which consists essentially of from 2 to 500 chemically combined units selected from the class consisting of (a) $$\frac{R''_hSiO_{(4-h)}}{2},$$

and mixtures of (a) and $$\frac{R'''_jSi_{(4-j)}}{2},$$

wherein the platinum complex is substantially halogen free, and where R is free of aliphatic unsaturation and is selected from the class consisting of monovalent hydrocarbon radicals and halogenated monovalent hydrocarbon radicals, R' is selected from the class consisting of monovalent aliphatically unsaturated hydrocarbon radicals and halogenated monovalent aliphatically unsaturated hydrocarbon radicals, R" is a vinyl radical chemically combined with platinum to effect new infrared absorption bands at 7.5 to 7.6 and 8.34 microns in the spectrum of the platinum-siloxane complex, R''' is selected from the class consisting of R radicals and R' radicals, $R^{iv}$ is selected from the class consisting of R radicals and cyanoalkyl radicals, $c$ has a value equal to 0 to 2, inclusive, $t$ has a value equal to 0.001 to 1, inclusive, the sum of $c$ and $t$ is equal to 1 to 3, inculsive, $h$ is an integer equal to 1 to 3, inclusive, $h$ is an integer equal to 1 to 3, inclusive, $j$ is a whole number equal to 0 to 3, inclusive, $n$ has a value equal to 0 to 2, inclusive, $p$ has a value equal to 0 to 2, inclusive, and $q$ has a value equal to 0.004 to 2, inclusive, and the sum of $n$, $p$, and $q$ is equal to 1 to 3, inclusive.

References Cited

UNITED STATES PATENTS

| | | | |
|---|---|---|---|
| 3,419,593 | 12/1968 | Willing | 260—448.2 |
| 3,474,123 | 10/1969 | Kelly et al. | 260—448.2 |
| 3,313,773 | 4/1967 | Lamoreaux | 260—46.5 |
| 3,715,334 | 2/1973 | Karstedt | 260—46.5 UA |

MELVYN I. MARQUIS, Primary Examiner

U.S. Cl. X.R.

260—37 SB, 46.5 G, 448.2 E, 825

Disclaimer

3,814,730.—*Bruce D. Karstedt,* Charlotte, N.C. PLATINUM COMPLEXES OF UNSATURATED SILOXANES AND PLATINUM CONTAINING ORGANOPOLYSILOXANES. Patent dated June 4, 1974. Disclaimer filed Apr. 19, 1983, by the assignee, *General Electric Co.*

Hereby enters this disclaimer to claims 1 through 8 of said patent.
[*Official Gazette June 21, 1983.*]